United States Patent [19]
Geibel et al.

[11] Patent Number: 5,200,499
[45] Date of Patent: Apr. 6, 1993

[54] REMOVAL OF WATER BY VENTING DURING THE POLYMERIZATION OF PHENYLENE SULFIDE POLYMERS WITH SULFUR SOURCE/POLAR ORGANIC COMPOUND MOLAR RATIO BEING AT LEAST 0.36/1

[75] Inventors: Jon F. Geibel, Bartlesville; John E. Inda, Dewey, both of Okla.

[73] Assignee: Phillips Petroleum Company, Bartlesville, Okla.

[21] Appl. No.: 619,559

[22] Filed: Nov. 29, 1990

[51] Int. Cl.$^5$ .............................................. C08G 75/16
[52] U.S. Cl. .................................. 528/388; 528/387; 528/390
[58] Field of Search ...................... 528/388, 387, 390

[56] References Cited

U.S. PATENT DOCUMENTS

| | | | |
|---|---|---|---|
| 3,354,129 | 11/1967 | Edmonds, Jr. et al. | 260/79 |
| 3,800,845 | 4/1974 | Scoggin | 159/47 |
| 3,919,177 | 11/1975 | Campbell | 260/79.1 |
| 4,116,947 | 9/1978 | Edmonds, Jr. et al. | 528/388 |
| 4,500,702 | 2/1985 | Ostlinning et al. | 528/388 |
| 4,767,841 | 8/1988 | Goetz et al. | 528/388 |
| 4,820,800 | 4/1989 | Geibel et al. | 528/388 |

*Primary Examiner*—Harold D. Anderson
*Attorney, Agent, or Firm*—Richmond, Phillips, Hitchcock & Carver

[57] ABSTRACT

A method is provided for increasing reactant concentrations for the polymerization of PPS without creating a deterioration of the molecular weight of the resultant polymer by venting excessive by-product water during the polymerization reaction.

10 Claims, No Drawings

REMOVAL OF WATER BY VENTING DURING THE POLYMERIZATION OF PHENYLENE SULFIDE POLYMERS WITH SULFUR SOURCE/POLAR ORGANIC COMPOUND MOLAR RATIO BEING AT LEAST 0.36/1

FIELD OF THE INVENTION

The present invention relates to a poly(phenylene sulfide) (hereinafter "PPS") polymerization process.

BACKGROUND OF THE INVENTION

Processes for maximizing the amount of PPS produced from a given reactor are desired for purposes of gaining economic efficiency. Increasing the concentration of reactants per reactor volume offers a seemingly evident approach to maximizing PPS production. However, after the concentration of reactants employed exceeds about 0.36 moles of sulfur source per mole of polar organic compound, the molecular weight of the PPS resin significantly decreases.

The molecular weight of a PPS resin is generally determined by the melt flow rate of the resin. Extrusion rate is a specific type of melt flow rate particularly useful for characterizing phenylene sulfide polymers in the a lower molecular weight range, such as those produced without a polymerization modifier such as an alkali metal carboxylate, as disclosed in U.S. Pat. No. 3,354,129, (Nov. 21, 1967). The term extrusion rate, as used herein, refers to a flow rate measurement on molten polymer based on ASTM D1238, Procedure B-Automatically Time Flow Rate Measurement, Condition 316/0.345, using a 5 minute preheat time and an orifice having the dimensions of 0.0825±0.002 inch diameter and 1.25±0.002 inch length. A low value extrusion rate indicates a higher molecular weight resin, while a high value extrusion rate indicates a lower molecular weight resin.

Maintaining a sufficiently high molecular weight PPS resin is important for many of the commercial applications of the resin such as injection molding and the like. The deterioration of molecular weight associated with using reactant concentrations greater than about 0.36 moles of sulfur source per mole of polar organic compound is of a significant enough degree to change the characteristics of the resultant polymer. Therefore, increasing reactant concentrations beyond 0.36 moles of sulfur source per mole of polar organic compound has not been a method utilized for purposes of maximizing PPS production.

SUMMARY OF THE INVENTION

It is therefore an object of the present invention to allow increased concentrations of reactants to be used in a phenylene sulfide polymerization process for purposes of maximizing PPS production.

It is a further object of this invention to provide a method for producing phenylene sulfide polymers more economically.

It is still a further object of the present invention to increase the amount of polymer produced per reactor volume without creating a deterioration of the molecular weight of the resultant polymer.

Accordingly, this invention is premised upon the discovery that increasing the concentration of reactants also increases the amount of by-product water produced during PPS polymerization. It is this increased amount of water present during polymerization that has been found to be detrimental to the molecular weight of the PPS resin. Venting the polymerization mixture prepared with a high concentration of reactants during the polymerization reaction releases the excessive by-product water and consequently allows the molecular weight of the PPS resin to be maintained at a sufficiently high level.

In accordance with this invention, phenylene sulfide polymers are prepared by a process comprising the sequential steps of: (a) dehydrating an aqueous admixture comprising at least one sulfur source and at least one polar organic compound to form a dehydrated admixture; (b) admixing at least one polyhalo-substituted aromatic compound with the dehydrated admixture from step (a) to produce a polymerization mixture wherein said sulfur source is present in a concentration of at least about 0.36 moles of sulfur source per mole of organic compound; (c) subjecting said polymerization mixture to polymerization conditions effective to produce a polymerization reaction; and (d) venting said polymerization mixture during said polymerization reaction after a portion of said polyhalo-substituted aromatic compound is consumed in said polymerization reaction, wherein said venting releases substantially by-product water produced during said polymerization reaction.

DETAILED DESCRIPTION OF THE INVENTION

According to this invention, the production of poly(phenylene sulfide) resin in a readily controllable manner is improved by venting the polymerization mixture during the polymerization reaction to remove excessive by-product water resulting from increasing reactant concentrations. The PPS polymerization reaction mixture is comprised of at least one sulfur source, at least one polar organic compound, and at least one polyhalo-substituted aromatic compound. The increase in reactant concentrations is best expressed in a molar ratio of sulfur source to polar organic compound where at least 0.36 moles of sulfur source per mole of polar organic compound is present in the polymerization mixture. It is at this increased concentration that the molecular weight of the polymer begins to deteriorate due to the production of excessive by-product water. One mole of by-product water is produced per one mole of sulfur source reacted. Accordingly, when moles of by-product water exceeds about 0.36 moles of by-product water per mole of polar organic compound, venting to remove the excessive water is necessary to prevent deterioration of the molecular weight of the resultant polymer.

According to this invention, compounds suitable for use as the sulfur source in the polymerization reaction mixture include alkali metal sulfides, alkali metal hydrosulfides, N-methyl-2-pyrrolidinethione, hydrogen sulfide, and mixtures thereof. The suitable alkali metal sulfides include lithium sulfide, sodium sulfide, potassium sulfide, rubidium sulfide, and cesium sulfide. The suitable alkali metal hydrosulfides include lithium hydrosulfide, sodium hydrosulfide, potassium hydrosulfide, rubidium hydrosulfide, and cesium hydrosulfide. Sodium sulfide and sodium hydrosulfide are presently preferred as suitable sulfur sources. It is often convenient to employ these sulfur source compounds as aqueous solutions or dispersions in the process of the invention. When sodium hydrosulfide is used a sulfur source, optionally sodium hydroxide may be employed. Other suitable sulfur sources are disclosed in U.S. Pat. No. 3,919,177, (Nov. 11, 1975), issued to Phillips Petroleum Company, the disclosure of which is hereby incorporated by reference.

The polar organic compounds which can be employed in the polymerization reaction mixture include organic amides, lactams, ureas, sulfones, and mixtures thereof. Examples of suitable polar organic compounds include N-methyl-2-pyrrolidone, N-methylcaprolactam, hexamethylphosphoramide, tetramethylurea, N,N-ethylene dipyrrolidone, pyrrolidone, caprolactam, N-ethylcaprolactam, 1,3-dimethyl-2-imidazolidinone, tetramethylene sulfone, N-ethyl-2-pyrrolidone, 1-methyl-4-isopropyl-2-piperazinone, 1,4-dimethyl-2-piperazinone, and mixtures thereof. For reasons of availability, stability and generally good results N-methyl-2-pyrrolidone is a preferred polar organic compound for use according to the invention. According to this invention preferably the sulfur source is present in an amount of at least about 0.36 moles of sulfur source per mole of polar organic compound. More preferably the sulfur source is present within a range from about 0.36 to about 0.6 moles of sulfur source per mole of polar organic compound, most preferably from 0.36 to 0.55 moles of sulfur source per mole of polar organic compound.

The polyhalo-substituted aromatic compounds that can be employed in the polymerization are compounds wherein the halogen atoms are attached to aromatic ring carbon atoms. Preferably, the halo-substituted aromatic compounds are p-dihalo-substituted compounds, and more preferably are selected from the group consisting of p-dihalobenzenes having the formula

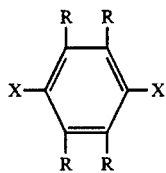

m-dihalobenzenes having the formula

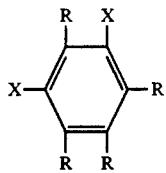

and o-dihalobenzenes having the formula

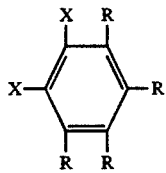

wherein X is a halogen selected from the group consisting of chlorine, bromine, and iodine, and R is hydrogen or an alkyl radical of 1–4 carbon atoms. Mixtures of suitable polyhalo-substituted aromatic compounds can also be employed according to the invention. For reasons of availability and generally good results, it is more preferred that dichlorobenzenes be employed with p-dichlorobenzene, thus giving p-phenylene sulfide polymers.

Further, though presently less preferred, polyhalo-substituted aromatic compounds having more than two halogen substituents per molecule can also be employed. These compounds are represented by the formula R"(X)n wherein X is as previously defined, R" is a polyvalent aromatic radical of 6 to about 16 carbon atoms and n is an integer of 3–6. Generally, the polyhalo-substituted aromatic compounds represented by the formula R"(X), when employed, are optional components utilized in small amounts in admixture with suitable dihalo-substituted aromatic compounds.

Examples of some suitable polyhalo-substituted aromatic compounds include, 1,4-dichlorobenzene, 1,3-dichlorobenzene, 1,2-dichlorobenzene, 1,4-dibromobenzene, 1,4-diiodobenzene, 1-chloro-4-bromobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1,2,3-trichlorobenzene, 1,2,4-trichlorobenzene, 1,3-dichloro-5-bromobenzene, 2,4,6-trichlorotoluene, hexachlorobenzene, 2,2'4,4'-tetrachlorobiphenyl, 2,2',6,6'-tetrabromobiphenyl, 4,4'-dichlorobiphenyl, and the like.

Although the amount of polyhalo-substituted aromatic compound present in the polymerization mixture can vary over a wide range, preferably the polyhalo-substituted aromatic compound is present within a range from about 0.90 to about 1.10 moles of polyhalo-substituted aromatic compound per mole of sulfur source, more preferably from 0.95 to 1.05 moles of polyhalo-substituted aromatic compound per mole of sulfur source, and most preferably from 0.98 to 1.02 moles of polyhalo-substituted aromatic compound per mole of sulfur source.

When polyhalo-substituted aromatic components having more than two halo constituents are used as comonomers, they are used in amounts within the range of from about 0.01 to about 1 mole percent, preferably from 0.05 to 0.8 mole percent, and more preferably 0.1 to 0.3 mole percent based on the total moles of polyhalo-substituted aromatic compounds.

The introduction of the polyhalo-substituted aromatic compound occurs after the sulfur source and polar organic compound have been combined, heated, and substantially dehydrated. The dehydration of the sulfur source and polar organic compound admixture occurs prior to the introduction of the polyhalo-substituted aromatic compound because the sulfur source component or components are generally found as aqueous solutions or dispersions, and the water must substantially be removed before polymerization begins.

Upon introduction of the polyhalo-substituted aromatic compound, the polymerization mixture is subjected to polymerization conditions sufficient to produce PPS polymers, as known to those skilled in the art. Such conditions, for example, are disclosed in U.S. Pat. No. 3,354,129, (Nov. 21, 1967), the disclosure of which is hereby incorporated by reference.

Although the reaction temperature at which the polymerization is conducted can vary over a wide range, generally it will be from about 125° C. to about 375° C., preferably about 175° C. to about 350° C. The reaction time can vary widely, depending in part on the reaction temperature, but generally will be about six minutes to about 72 hours, preferably about one hour to about eight hours. The pressure should be sufficient to maintain the organic components of the reaction mixture substantially in the liquid phase.

According to the invention, venting of the polymerization mixture occurs during the polymerization reaction. By-product water is produced upon the consumption of the polyhalo-substituted aromatic compound. Accordingly, venting for purposes of removing the excessive level of by-product water becomes necessary only after a portion of the polyhalo-substituted aromatic compound has been consumed. If venting occurs too early in the polymerization or for too long of a period, the polymerization stoichiometry will be shifted, and the polymerization will be disrupted. Such a disruption in polymerization may cause the entire batch of PPS to turn into an undesirable, foul smelling product containing volatile sulfur chemicals, commonly referred to as a "stinker."

For purposes of avoiding the disruption of the polymerization stoichiometry, it is necessary that venting occur after the onset of polymerization when a portion of the polyhalo-substituted aromatic compound has been allowed to react. Preferably, venting occurs during polymerization after about 20% to 95% of the polyhalo-substituted aromatic compound is consumed. More preferably, venting occurs during polymerization after about 50% to 80% of the polyhalo-substituted aromatic compound is consumed. The rate of consumption of the polyhalo-substituted aromatic compound is generally known in the art, although specific determination of the amount consumed can be found by taking a sample of the polymerization mixture during specific periods of polymerization and evaluating the mixture by gas chromatography. Additionally, the venting should be limited in duration such that the liquid dispelled is substantially by-product water rather than liquid containing polymerization reactants.

The techniques appropriate for venting the polymerization mixture include any of those venting techniques typically used in condensation polymerization, as known to those skilled in the art. As stated previously, venting a reactor is known in the art because in PPS polymerizations, the reactor is generally dehydrated after the sulfur source and polar organic compound are combined and heated, prior to the introduction of the polyhalo-substituted aromatic compound and onset of polymerization. The venting system employed in the first dehydration of the sulfur source and polar organic compound can also be used for the inventive venting that occurs during the polymerization. In the simplest form, for example, the venting can be accomplished by manipulating a valve connected to the reactor. The valve is opened, thereby dispelling pressure and steam into a overhead collection device, and a liquid containing mostly water is collected.

The phenylene sulfide polymers produced by the process of the invention can be separated from the reaction mixture by conventional procedures, e.g., by filtration of the cooled and solidified polymer, followed by washing with water or by dilution of the reaction mixture with water or polar organic compound or mixtures of water and polar organic compound, followed by filtration and water washing of the polymer.

The phenylene sulfide polymer produced by the process of the invention can be blended with fillers, pigments, extenders, other polymers, and the like. The polymer can be cured by heating at temperatures up to about 480° C. in the presence of a free oxygen-containing gas, to provide cured products having improved properties and high thermal stability and good chemical resistance. It is useful in the production of coatings and molded objects.

EXAMPLES

In the following examples, phenylene sulfide polymer extrusion rates were determined by the method of ASTM D 1238-79, Procedure B-Automatically Timed Flow Rate Measurement, Condition 316/0.345, modified to use a 5 minute preheat time. The orifice had a 2.096+/−0.005 mm diameter and a 31.75+/−0.05 mm length. Extrusion rate values are expressed as g/10 min. Extrusion rates for Examples 2-6 were measured using the cut and weigh method.

EXAMPLE I

This example describes control runs 1-3 made outside the scope of the present invention, prepared without a vent step during the polymerization of the phenylene sulfide polymer.

In run 1, a 7.6 liter stirred autoclave was charged with 6.00 g-mol sodium hydrosulfide (NaSH) as an aqueous mixture containing 59.6 wt. % NaSH, 6.05 g-mol sodium hydroxide (NaOH), and 12.02 g-mol N-methyl-2-pyrrolidone (NMP). The autoclave contents were stirred and flushed five times with nitrogen. A dehydration step was carried out by heating the mixture and collecting liquid overhead. The reactor was cooled to 175° C. and charged with 6.15 g-mol p-dichlorobenzene (DCB) and 3.36 g-mol NMP. The sulfur/ NMP mole ratio charged was 0.39, but since some NMP was lost during dehydration, the actual ratio during the polymerization step was 0.415. After heating the autoclave contents to 235° C. and holding for one hour at a pressure of 120 psig, the temperature was increased to 265° C. and held for one hour at a pressure of 210 psig. The autoclave was then heated to 280° C. and held for one hour at a pressure of 265 psig. After the autoclave was cooled and opened, the contents were washed three times with hot, deionized water and once with cold, deionized water. The polymer was dried in a forced air oven at 118° C. The polymer extrusion rate for run 1 was 76 g/10 min., indicating a relatively low molecular weight PPS results if the inventive venting step is not included in the polymerization process.

The polymerization of runs 2 and 3 were carried out in a manner similar to that described above for control run 1. Excess water was added during the polymerization for purposes of emphasizing the polymer degradation which occurs when excessive water is present during polymerization. The S/NMP ratios during the polymerization step in runs 2 and 3 were 0.420 and 0.417, respectively. In run 2, 50 mL of deionized water was added after the DCB charge and in run 3, 100 mL of deionized water was added. The PPS product from run 2 was too fluid to determine the extrusion rate thereby indicating an extremely low molecular weight resin. The product from run 3 was a "stinker" product, a foul smelling product containing volatile sulfur chemicals.

The extrusion rate data for control runs 1-3 appear in TABLE I, and clearly demonstrate the deleterious effect of high levels of water present during the PPS polymerization.

EXAMPLE II

This example describes a run where too much liquid was removed by the venting during the polymerization.

Run 4 was carried out in a manner similar to that described in Example I for runs 1–3, except that 66 mL of liquid were removed during a vent step after the 235° C. hold, during polymerization. The sulfur/NMP mole ratio in the polymerization step was 0.415. The autoclave conditions before the venting were 235° C./90 psig and were 234° C./30 psig after the venting. The length of the venting step was considered excessive because the reactor was opened to reveal a "stinker" product, a foul smelling product containing volatile sulfur chemicals. Apparently, by venting too long, more than just excess by-product water was expelled. Reactants were removed along with the water during the venting thereby causing the polymerization stoichiometry to shift and resulting in deleterious reactions and polymer degradation.

Run 4 is listed in TABLE I for purposes of comparison.

EXAMPLE III

This example describes inventive runs 5 and 6, in which the autoclave was vented after the 235° C. hold in the procedure outlined in Example I. Both runs were carried out as described in Example I except that after the 235° C. hold, the autoclave was vented to remove 32 mL of liquid. The sulfur/NMP mole ratios in the polymerization step were 0.418 and 0.412 for runs 5 and 6, respectively. The autoclave conditions in both runs before venting were 235° C./100 psi and after venting were 226° C./40 psi. The PPS products in runs 5 and 6 both had extrusion rates of 28 g/10 min.

Runs 5 and 6 appear in TABLE I. As demonstrated, the inventive step of venting shows that the resulting polymer has an increase in molecular weight comparing inventive runs 5 and 6 with runs 1–4. Removal of water from polymerization mixtures with high S/NMP mole ratios allows for the production of a higher molecular weight polymer.

EXAMPLE IV

This example describes a series of PPS polymerizations, runs 7–11, carried out for purposes of demonstrating the effect on the polymer when the inventive venting is carried out at different points during the polymerization.

Each run was prepared in the manner described in Example I, except that a vent step was performed during polymerization. All polymerizations were carried out with an initial S/NMP mole ratio of 0.39. NMP was charged to the autoclave with the DCB to compensate for NMP loss during the dehydration step to maintain a S/NMP mole ratio during the polymerization of 0.39. In runs 7, 8, and 9, the autoclave was cooled to 150° C. after the 265° C. hold and vented. In runs 10 and 11, the autoclave was vented after the 265° C. hold without cooling the autoclave. In several of the runs, small quantities of DCB were present in the condenser. In run 7, the DCB in the condenser was returned to the autoclave, thereby bringing the molar amount of DCB back to 6.30 g-mol. In runs 8–11, 6.15 g-mol of DCB were employed.

The extrusion rate values obtained for runs 7–11 appear in TABLE I. Each of the extrusion rates for runs 7–11 indicates a relatively high molecular weight resin results when the inventive process is employed. These runs also demonstrate that water can be removed in a vent step at several points in the PPS polymerization to produce PPS with acceptable extrusion rates.

TABLE I

| | PPS Polymerizations | | | |
|---|---|---|---|---|
| Run | DCB, g-mol | Sulfur/ NMP Mole Ratio | Liquid Recovered mL | Extrusion Rate g/10 Min. |
| 1 | 6.15 | 0.415 | 0 | 76 |
| 2 | 6.15 | 0.420 | Add 50$^a$ | —$^b$ |
| 3 | 6.15 | 0.417 | Add 100$^a$ | —$^c$ |
| 4 | 6.15 | 0.415 | 66 | —$^c$ |
| 5 | 6.15 | 0.418 | 32 | 28 |
| 6 | 6.15 | 0.412 | 32 | 28 |
| 7 | 6.30 | 0.39 | 34 | 25 |
| 8 | 6.15 | 0.39 | 34 | 28 |
| 9 | 6.15 | 0.39 | 33 | 45 |
| 10 | 6.15 | 0.39 | 26 | 36 |
| 11 | 6.15 | 0.39 | 49 | 39 |

$^a$Water was added after DCB charge rather than removed.
$^b$Product was too fluid to determine an extrusion rate.
$^c$Product was not measured for an extrusion rate because it was a "stinker".

As shown in TABLE I, the extrusion rate values were consistently lower for those resins prepared by the inventive process, runs 5–11. Such data indicate reactant concentrations greater than 0.36 moles of sulfur source per mole of NMP can be used for the production of commercially acceptable PPS without sacrificing the molecular weight of the resins.

EXAMPLE V

This example further demonstrates the inventive process of venting the polymerization reaction mixture during polymerization.

A series of polymerizations, inventive runs 12–15, were carried out in a 341 liter stirred reactor for the preparation of PPS using the present invention. The quantities of reactants and polar organic compound were varied and are listed in Table II. In each run the aqueous NaOH (50.19 wt % NaOH) and the aqueous NaSH (60.059 wt % NaSH and 0.457 wt % Na$_2$S) were premixed in a separate vessel and then the warmed (about 115° C.) liquid mixture was charged with a following NMP flush to the reactor containing the remaining NMP. This mixture was subjected to a dehydration step wherein water plus some NMP was removed from the reactor by distillation at a reflux ratio of 1/1. The amount of liquid taken overhead ranged from 29.6 to 34.5 kg.

Molten DCB was charged into the reactor which was at a temperature of 231° C. to 235° C. and the reaction mixture held at about 232° C. for one hour. The reactor temperature was increased to 275° C. and a brief vent operation was done to remove water before holding the reactor contents at 275° C. for 1.5 hours. The reactor was then vented in preparation for the flash recovery of volatiles over about one hour to 70 psig, heated to about 282° C., and the reactor contents were transferred to another vessel where reduced pressure conditions caused NMP and other volatiles to be flashed overhead for recovery.

The reaction mixture containing the PPS was washed with ambient temperature tap water followed by a rinse with 82° C. tap water, washed with hot (177° C.) deaerated tap water followed with a rinse with 82° C. deionized water. The washed PPS from each run was filtered, dried, and tested for extrusion rate. The results are shown below in TABLE II.

TABLE II

PPS Polymerizations

| Run | NaOH, kg-mol | NaSH, kg-mol | DCB kg-mol | NMP kg-mol | S/NMP mole ratio | Liquid Vented, kg | Extrusion Rate, g/10 min. |
|---|---|---|---|---|---|---|---|
| 12 | 0.407 | 0.419 | 0.430 | 1.27 | 0.33 | 2.14 | 38 |
| 13 | 0.419 | 0.433 | 0.443 | 1.235 | 0.35 | 2.55 | 66 |
| 14 | 0.440 | 0.453 | 0.464 | 1.192 | 0.38 | 2.89 | 43 |
| 15 | 0.460 | 0.474 | 0.483 | 1.129 | 0.42 | 2.48 | 53 |

The results depicted in TABLE II indicate that PPS with suitable extrusion rates can be prepared at S/NMP ratios varying from 0.33 to 0.42 when a vent step is utilized to remove water from the polymerization mixture.

While this invention has been described in detail for the purpose of understanding the invention, it is not to be construed as limited thereby but is intended to cover all changes and modifications within the spirit and scope thereof.

That which is claimed is:

1. A process for producing phenylene sulfide polymers comprising the sequential steps of:
   (a) dehydrating an aqueous admixture comprising at least one sulfur source and at least one polar organic compound to form a dehydrated admixture;
   (b) admixing at least one polyhalo-substituted aromatic compound with the dehydrated admixture from step (a) to produce a polymerization mixture, wherein said sulfur source is present in a concentration of at least about 0.36 moles of sulfur source per mole of polar organic compound;
   (c) subjecting said polymerization mixture to polymerization conditions effective to produce a polymerization reaction wherein said polyhalo-substituted aromatic compound is consumed and by-product water is produced; and
   (d) venting said polymerization mixture during said polymerization reaction after a portion of said polyhalo-substituted aromatic compound is consumed in said polymerization reaction, wherein said venting releases substantially by-product water produced during said polymerization reaction.

2. A process according to claim 1 wherein said sulfur source in step (a) is selected from the group consisting of alkali metal sulfide, alkali metal hydrosulfides, N-methyl-pyrrolidinethione, hydrogen sulfide, and mixtures thereof; said polar organic compound in step (a) is selected from the group consisting of organic amides, lactams, ureas, sulfones, and mixtures thereof; said polyhalo-substituted aromatic compound is selected from the group consisting of p-dihalobenzenes having the formula m-dihalobenzenes having the formula and o-dihalobenzenes having the formula and mixtures thereof, wherein X is a halogen selected from the group consisting of chlorine, bromine, and iodine, and R is hydrogen or an alkyl radical of 1–4 carbon atoms; and said venting in step (d) occurs after 20% to 95% of said polyhalo-substituted aromatic compound is consumed in said polymerization reaction.

3. A process according to claim 2 wherein said sulfur source in step (a) is selected from the group consisting of sodium sulfide and sodium hydrosulfide; said polar organic compound in step (a) is N-methyl-2-pyrrolidone; said polyhalo-substituted aromatic compound in step (b) comprises p-dichlorobenzene; and said venting in step (d) occurs after 50% to 80% of said polyhalo-substituted aromatic compound is consumed in said polymerization reaction.

4. A process according to claim 1 wherein said polyhalo-substituted aromatic compound is present within a range from about 0.90 to about 1.10 moles of polyhalo-substituted aromatic compound per mole of sulfur source.

5. A process according to claim 4 wherein said sulfur source is present within a range from 0.36 to 0.6 moles of sulfur source per mole of polar organic compound and said polyhalo-substituted aromatic compound is present within a range from 0.95 to 1.05 moles of polyhalo-substituted aromatic compound per mole of sulfur source.

6. A process according to claim 5 wherein said sulfur source is present within a range from 0.36 to 0.55 moles of sulfur source per mole of polar organic compound and said polyhalo-substituted aromatic compound is present within a range from about 0.98 to 1.02 moles of polyhalo-substituted aromatic compound per mole of sulfur source.

7. A process according to claim 1 further comprising introducing a polyhalo-substituted aromatic component having more than two halo constituents present in an amount within the range of from about 0.01 to about 1 mole percent based on the total moles of said polyhalo-substituted aromatic compounds.

8. A process according to claim 7 wherein said polyhalo-substituted aromatic component having more than two halo constituents present in an amount within the range of from about 0.05 to about 0.8 mole percent based on the total moles of said polyhalo-substituted aromatic compounds.

9. A process according to claim 8 wherein said polyhalo-substituted aromatic component having more than two halo constituents present in an amount within the range of from about 0.1 to about 0.3 mole percent based on the total moles of said polyhalo-substituted aromatic compounds.

10. A process according to claim 1 wherein said sulfur source in step (a) is a mixture of sodium sulfide and sodium hydrosulfide and is present within a range from 0.36 to 0.55 moles of sulfur source per mole of polar organic compound; said polar organic compound in step (a) is N-methyl-2-pyrrolidone; said polyhalo-substituted aromatic compound in step (b) comprises p-dichlorobenzene and is present with a range from about 0.98 to 1.02 moles of polyhalo-substituted aromatic compound per mole of sulfur source; and said venting in step (d) occurs after 50% to 80% of said polyhalo-substituted aromatic compound is consumed in said polymerization reaction.

* * * * *